(12) United States Patent
Lesso et al.

(10) Patent No.: US 12,613,206 B2
(45) Date of Patent: Apr. 28, 2026

(54) ELECTROCHEMICAL CELL CHARACTERISATION

(71) Applicant: Cirrus Logic International Semiconductor Ltd., Edinburgh (GB)

(72) Inventors: John P. Lesso, Edinburgh (GB); Ivan Perry, Penicuik (GB)

(73) Assignee: Cirrus Logic Inc., Austin, TX (US)

( * ) Notice: Subject to any disclaimer, the term of this patent is extended or adjusted under 35 U.S.C. 154(b) by 213 days.

(21) Appl. No.: 18/221,653

(22) Filed: Jul. 13, 2023

(65) Prior Publication Data

US 2025/0020608 A1     Jan. 16, 2025

(51) Int. Cl.
| | |
|---|---|
| *G01N 27/02* | (2006.01) |
| *H01M 10/42* | (2006.01) |
| *H01M 10/48* | (2006.01) |

(52) U.S. Cl.
CPC ........ *G01N 27/026* (2013.01); *H01M 10/425* (2013.01); *H01M 10/48* (2013.01); *H01M 2010/4271* (2013.01)

(58) Field of Classification Search
CPC . G01N 27/026; G01N 27/416; H01M 10/425; H01M 10/48; H01M 2010/4271; A61B 5/145; A61B 5/14532; G01R 31/389
See application file for complete search history.

(56) References Cited

U.S. PATENT DOCUMENTS

| | | | | |
|---|---|---|---|---|
| 5,273,640 A | * | 12/1993 | Kusanagi | G01N 27/4175 |
| | | | | 204/415 |
| 7,147,761 B2 | * | 12/2006 | Davis | G01N 27/4045 |
| | | | | 204/291 |

| | | | | |
|---|---|---|---|---|
| 2008/0302673 A1 | * | 12/2008 | Scheffler | G01N 33/0006 |
| | | | | 204/412 |
| 2022/0273198 A1 | | 9/2022 | Nogueira et al. | |
| 2023/0211341 A1 | | 7/2023 | Dalton et al. | |

FOREIGN PATENT DOCUMENTS

| | | | | |
|---|---|---|---|---|
| CN | 112993391 A | * | 6/2021 | |
| CN | 114199947 A | * | 3/2022 | |
| WO | 2022084405 A1 | | 4/2022 | |

OTHER PUBLICATIONS

English translation of CN-114199947-A (Year: 2022).*
English translation of CN-112993391-A (Year: 2021).*
International Search Report and Written Opinion of the International Searching Authority, International Application No. PCT/GB2024/051229, mailed Sep. 2, 2024.

* cited by examiner

*Primary Examiner* — Huy Q Phan
*Assistant Examiner* — Haidong Zhang
(74) *Attorney, Agent, or Firm* — Jackson Walker L.L.P.

(57)     ABSTRACT

Circuitry for determining one or more characteristics of an electrochemical cell comprising a first working electrode and a counter electrode, the circuitry comprising: drive circuitry configured to apply a first stimulus to the first working electrode; measurement circuitry configured to measure a first response at the first working electrode; and processing circuitry configured to: applying compensation to the first response to obtain a first corrected response of the electrochemical cell to the first stimulus; and determine a first characteristic of the one or more characteristics of the electrochemical cell based on the first corrected response, the first characteristic associated with the first working electrode.

27 Claims, 6 Drawing Sheets

ELECTROCHEMICAL CELL CHARACTERISATION

TECHNICAL FIELD

The present disclosure relates to circuitry for measuring characteristics in electrochemical cells.

BACKGROUND

Electrochemical impedance spectroscopy (EIS) (also known as dielectric spectroscopy) is a known technique for characterising electrochemical systems, such as electrochemical cells. This technique measures the impedance of a system over a range of frequencies, and therefore a frequency response of the system. Properties of the system, including energy storage and dissipation properties, can be ascertained from this measured frequency response.

A traditional approach to EIS involves using a digital-to-analog converter (DAC) to drive a stimulus, typically a sine wave, into an electrochemical system and using an analog-to-digital converter (ADC) to measure a response to that stimulus. For an amperometric electrochemical sensor (e.g. a potentiostat), the stimulus is typically a voltage applied to a counter electrode of the sensor, and the measured response is a current measured at a working electrode of the sensor. For an electrochemical cell acting as a power source (i.e. a battery), the driving stimulus is typically a current, and the measured response is a voltage. The frequency of the stimulus can be varied (e.g., swept) to obtain a response over a range of stimulation frequencies.

An alternative approach to EIS is chronoamperometry (CA) in which a step or impulse function stimulus is applied to a cell and a transfer function between the stimulus and a measured response to that stimulus is estimated or inferred.

SUMMARY

According to a first aspect of the disclosure, there is provided circuitry for determining one or more characteristics of an electrochemical cell comprising a first working electrode and a counter electrode, the circuitry comprising: drive circuitry configured to apply a first stimulus to the first working electrode; measurement circuitry configured to measure a first response to the first stimulus at the first working electrode; and processing circuitry configured to: apply compensation to the first response to obtain a first corrected response of the electrochemical cell to the first stimulus; and determine a first characteristic of the one or more characteristics of the electrochemical cell based on the first corrected response, the first characteristic associated with the first working electrode.

The first stimulus may comprise a sine wave or a plurality of sine waves which may be modulated by one or more of amplitude and frequency. For example, the stimulus may be modulated in accordance with one or more electrochemical impedance spectroscopy (EIS) techniques.

The first stimulus may comprise a step signal or an impulse signal, for example in accordance with one or more chronoamperometry (CA) techniques.

Applying the first stimulus may comprise: modulating a first working bias voltage applied at the first working electrode.

The drive circuitry may be configured to apply a counter bias voltage at the counter electrode.

Applying compensation to the first response may comprise subtracting the first stimulus from the first response.

The processing circuitry may comprise: a differential analog-to-digital converter (ADC), comprising: a first analog input configured to receive the first response; a second analog input configured to receive the first stimulus; and a digital output configured to output the first corrected response. The second analog input of the ADC may be a negative or inverting input of the ADC.

The processing circuitry may comprise: an analog-to-digital converter (ADC), comprising: a first analog input configured to receive the first response; and a digital output configured to output a first digital response signal and compensation circuitry configured to subtract a digital representation of the applied stimulus from the first digital response signal to obtain the first corrected response signal.

The first stimulus may be a voltage stimulus and the first response may be a response current.

The first characteristic may be an impedance or a resistance of the electrochemical cell.

The drive circuitry may comprise: a digital-to-analog converter configured to generate the first stimulus based on a digital input signal.

The circuitry may comprise: a first transimpedance amplifier, comprising: a first inverting input coupled to the first working electrode; a first non-inverting input configured to receive the first stimulus; and a first output configured to output the first response.

The circuitry may comprise: a current conveyor, comprising: a first input coupled to the first working electrode; a second input coupled configured to receive the first stimulus; and a first output configured to output the first response.

The electrochemical cell may comprise a second working electrode. The drive circuitry may be configured to apply a second stimulus to the second working electrode. The measurement circuitry may be configured to measure a second response at the second working electrode. The processing circuitry may be configured to apply compensation to the second response to obtain a second corrected response of the electrochemical cell to the second stimulus; and determine a second characteristic of the one or more characteristic of the electrochemical cell based on the second corrected response, the second characteristic associated with the second working electrode.

Applying compensation to the second response may comprise subtracting the second stimulus from the second response.

The first working electrode may be configured to detect a first analyte and the second working electrode may be configured to detect second analyte different from the first analyte. The first and second analytes may comprise one of glucose, lactate and ketone. For example, the first analyte may be glucose and the second analyte may be lactate or a ketone.

The processing circuitry may be configured to determine, based on the determined first characteristic, one or more of the following: a) an optimum bias voltage to be applied to the electrochemical cell during sensing of an analyte; b) a quality of an electrolyte in the electrochemical cell; c) a fault at the electrochemical cell; d) one or more offsets for processing signals obtained from the electrochemical cell; e) updates for an equivalent circuit model (ECM) for the electrochemical cell.

The electrochemical cell may be an electrochemical sensor. The stimulus may be a stimulus voltage, and the measured response may be a response current.

The circuitry may further comprise a memory.

The drive circuitry may comprise a digital-to-analog converter (DAC) configured to generate the first stimulus responsive to a first digital input signal.

The electrochemical cell may comprise a potentiostat.

The electrochemical cell may comprise a battery.

According to another aspect of the disclosure, there is provided a system comprising: the circuitry of any one of the preceding claims; and the electrochemical cell.

According to another aspect of the disclosure, there is provided an electronic device, comprising the circuitry or the system described above. The device may comprise an analyte monitoring device or an analyte sensing device, such as a continuous glucose monitor. The device may comprise a battery or battery monitor. The device may comprise one of a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method of determining one or more characteristics of an electrochemical cell comprising a first working electrode and a counter electrode, the circuitry comprising: drive circuitry configured to apply a first stimulus to the first working electrode; measurement circuitry configured to measure a first response at the first working electrode; and processing circuitry configured to: applying compensation to the first response to obtain a first corrected response of the electrochemical cell to the first stimulus; and determine a first characteristic of the one or more characteristics of the electrochemical cell based on the first corrected response, the first characteristic associated with the first working electrode.

In some embodiments, the stimulus may comprise a voltage stimulus and the measured response may comprise a response current. In such case, the electrochemical cell may comprise an amperometric sensor, such as a potentiostat.

In some embodiments, the stimulus may comprise a stimulus current and the measured response may comprise a voltage response. In such cases, the electrochemical cell may comprise or be part of a power source (e.g. a battery).

According to another aspect of the disclosure, there is provided a system comprising the circuitry described above; and the electrochemical cell described above.

According to another aspect of the disclosure, there is provided an electronic device, comprising the circuitry or the system described above.

The electronic device may comprise or be incorporated into one of a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method of determining an impedance of an electrochemical cell comprising at least one first electrode and a second electrode, the method comprising: applying a stimulus to the electrochemical cell, the stimulus having a stimulation frequency and a stimulation amplitude; measuring a response of the electrochemical cell to the stimulus; and determining an estimated transfer function of the electrochemical cell based on the stimulus and the response; determining a score for the estimated transfer function; and adjusting the stimulus or circuitry used to measure the response based on the score.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Electrochemical sensors are widely used for the detection of one or more particular chemical species, analytes, as an oxidation or reduction current. Such sensors comprise an electrochemical cell, consisting of two or more electrodes configured for contact with an analyte whose concentration is to be ascertained. Such sensors also comprise circuitry for driving one or more of the electrodes and for measuring a response at one or more of the electrodes. Batteries also comprise one or more electrochemical cells which typically consist of two or more electrodes (e.g., an anode and a cathode) configured for contact with a conductive electrolyte. Characteristics of batteries may be ascertained using drive and measurement circuitry similar to that used for characterising electrochemical cells in electrochemical sensors.

Embodiments of the present disclosure provide various novel drive and measurement regimes for characterising electrochemical cells and systems (such as sensors, batteries and the like) into which electrochemical cells are incorporated.

Various implementation details pertaining to drive and measurement circuitry for obtaining characterising impedance measurements of an electrochemical cell are described below. Such embodiments focus primarily on electrochemical cells comprised in sensors (e.g. potentiostats). For example, the embodiments described herein may be implemented as part of an analyte monitoring system, such as a continuous glucose monitor (CGM). It will be appreciated, however, that embodiments are not limited to use with electrochemical sensors. For example, batteries also comprise one or more electrochemical cells which typically consist of two or more electrodes (e.g., an anode and a cathode) configured for contact with a conductive electrolyte. Impedance characteristics of batteries (e.g. comprising lithium ion or silver oxide cell(s)) may be ascertained using drive and measurement circuitry described herein. For example, embodiments of the present disclosure may be implemented as part of battery monitoring device (e.g. to monitor the status and/or health of a battery).

Figure 1:
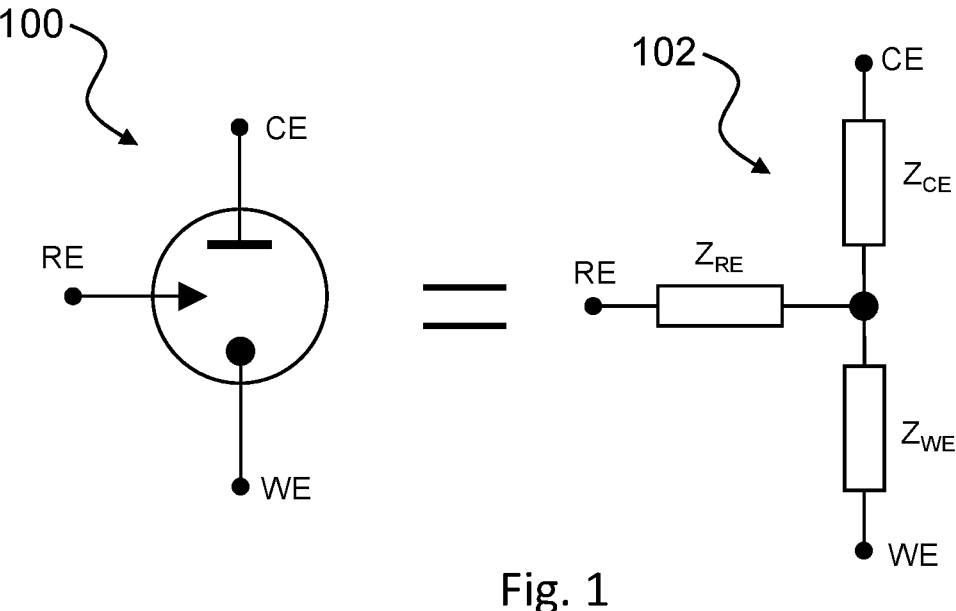
FIG. 1 illustrates a schematic diagram and electrical equivalent circuit for a three-electrode electrochemical cell.

FIG. 1 is a schematic diagram of an example electrochemical cell 100 comprising three electrodes, namely a counter electrode CE, a working electrode WE and a reference electrode RE. FIG. 1 also shows an equivalent circuit 102 for the electrochemical cell 100 comprising a counter electrode impedance ZCE, a working electrode impedance ZWE and a reference electrode impedance ZRE.

Figure 2:
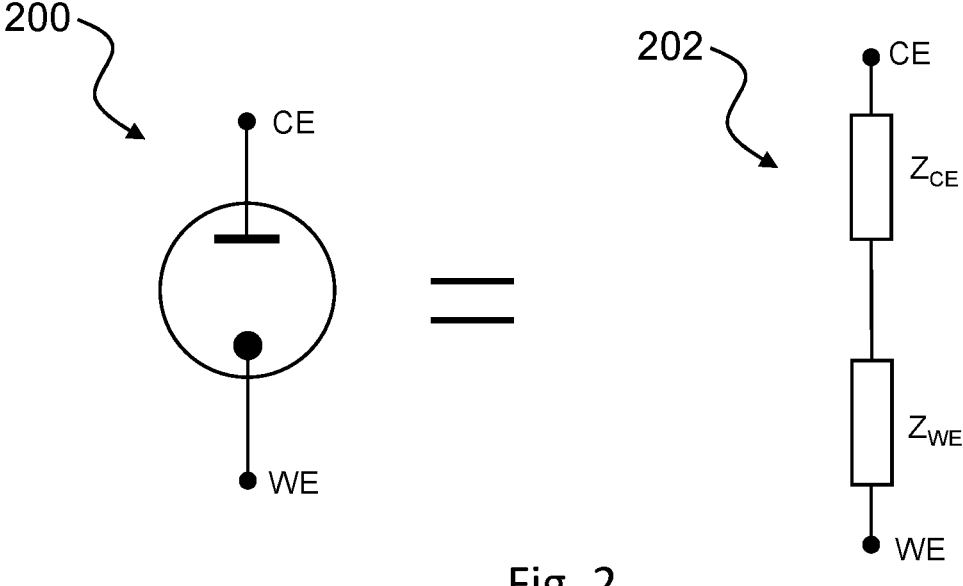
FIG. 2 illustrates a schematic diagram and electrical equivalent circuit for a two-electrode electrochemical cell.

FIG. 2 is a schematic diagram of another example electrochemical cell 200 comprising two electrodes, namely a counter electrode CE and a working electrode WE. The electrochemical cell 200 varies for the cell 100 with the omission of the reference electrode RE. FIG. 2 also shows an equivalent circuit 102 for the electrochemical cell 200 comprising a counter electrode impedance ZCE and a working electrode impedance ZWE.

In some embodiments, the working electrode WE comprises an assay or chemical of interest. For example for the analysis of glucose as an analyte, the working electrode may comprise a layer of glucose oxidase. The counter electrode CE is provided to form an electrical or ohmic connection with the working electrode WE. Optionally, the reference electrode is provided, which is typically a sensing point between the working electrode WE and the counter electrode CE, allowing independent measurement of the potential associated with each of the working and counter electrodes WE. CE, rather than just measuring a potential difference between the counter and working electrodes CE, WE.

Embodiments of the disclosure will be described with reference to these example electrochemical cells 100, 200.

It will be appreciated, however, that the techniques and apparatus described herein may be used in conjunction with any conceivable electrochemical system, including but not limited to electrochemical cells comprising at least two electrodes (e.g. a counter electrode CE, a working electrode WE and optionally a reference electrode RE), or electrochemical cells with more than three electrodes (e.g. two or more counter electrodes and/or two or more working electrodes). Electrodes of the electrochemical cells described herein may also be referred to as anodes and/or cathodes as is conventional in the field of electrical batteries.

To determine a characteristic of either of the electrochemical cells 100, 200, and therefore an analyte concentration, it is conventional to apply a bias voltage at the counter electrode CE and measure a current at the working electrode WE. When provided, the reference electrode RE may be used to measure a voltage drop between the working electrode WE and the reference electrode RE. The bias voltage is then adjusted to maintain the voltage drop between the reference and working electrodes RE, WE constant. As the resistance in the cell 100 increases, the current measured at the working electrode WE decreases. Likewise, as the resistance in the cell 100 decreases, the current measured at the working electrode WE increases. Thus the electrochemical cell 100 reaches a state of equilibrium where the voltage drop between the reference electrode RE and the working electrode WE is maintained constant. Since the bias voltage at the counter electrode CE and the measured current at WE are known, the resistance of the cell 100 can be ascertained.

Figure 3:
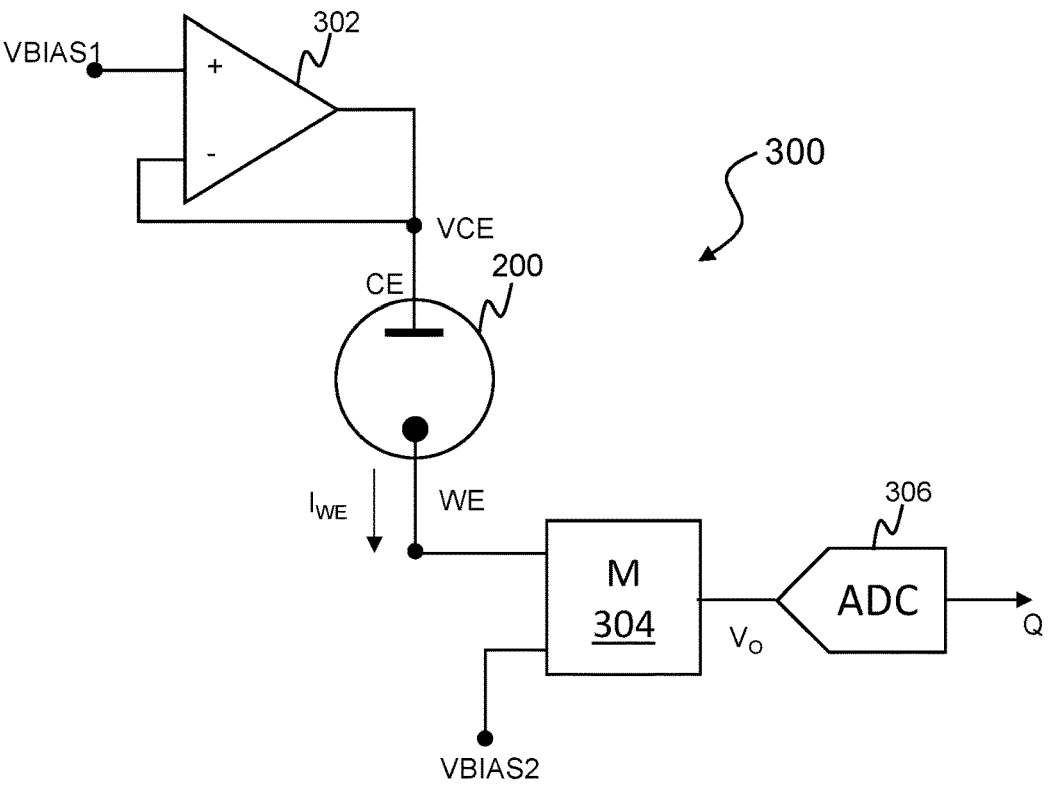
FIG. 3 is a schematic diagram of an example prior art drive and measurement circuit.

FIG. 3 illustrates an example prior art drive and measurement circuit 300 which is configured to implement the above explained cell characterisation, specifically for measuring an analyte concentration in the electrochemical cell 200 shown in FIG. 2. The circuit 300 comprises a first amplifier 302 and a measurement circuit 304. Each of the first amplifier 302 and the measurement circuit 304 may comprise one or more op-amps. A non-inverting input of the first amplifier 302 is coupled to a bias voltage VBIAS which may be generated by a digital-to-analog converter DAC (not shown). An inverting input of the first amplifier 302 is coupled to the counter electrode CE. An output of the first amplifier 302 is coupled to the counter electrode CE and configured to drive the counter electrode CE with a counter electrode bias voltage VCE. The counter electrode bias voltage VCE applied at the counter electrode CE by the first amplifier 202 is proportional to the difference between the bias voltage VBIAS1 and the voltage at the counter electrode CE.

The measurement circuit 304 is coupled between the working electrode WE and an analog-to-digital converter (ADC) 306. The measurement circuit 304 is operable to output to the ADC 306 a signal proportional to the current flowing from the working electrode WE. The ADC 306 then converts the signal output from the measurement circuit 304 to a digital output signal Q which represents the current flowing from the working electrode WE.

The measurement circuit 304 typically implemented as a transimpedance amplifier or a current conveyor.

Figure 4:
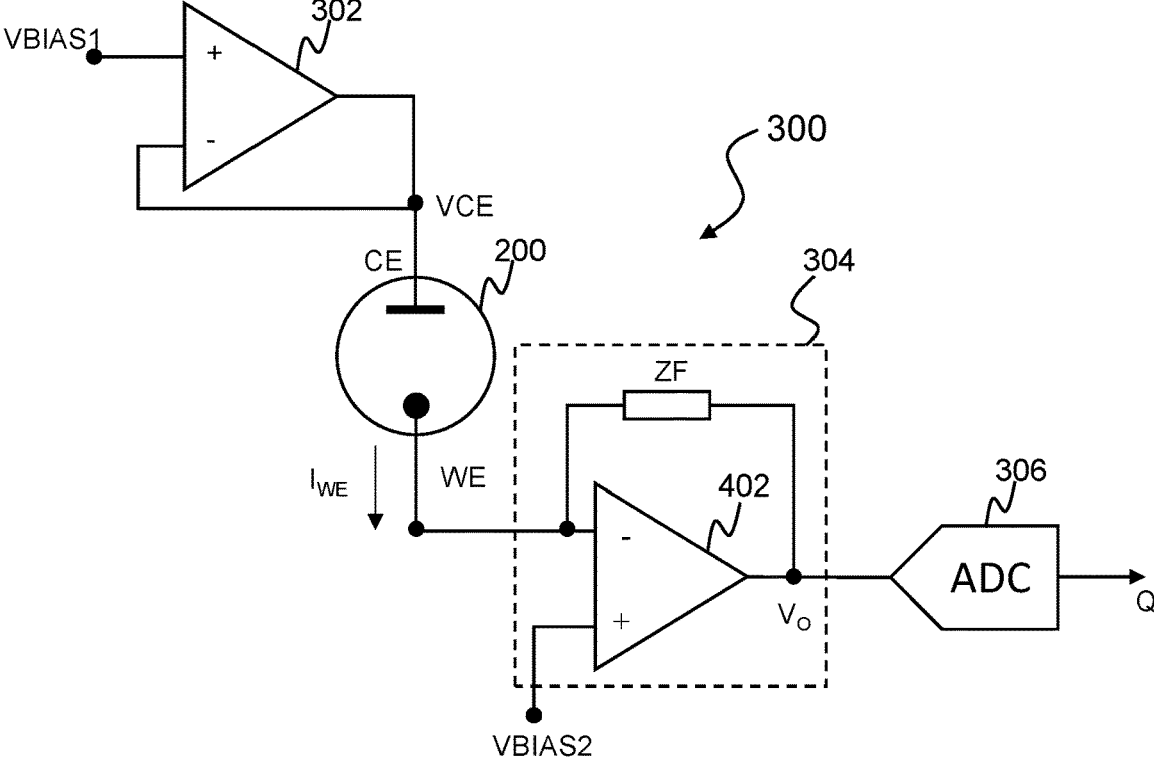
FIG. 4 is an example implementation of the circuit of FIG. 3.

FIG. 4 illustrates an example implementation of the drive and measurement circuit 300, the measurement circuit 304 implemented as a transimpedance amplifier comprising a second amplifier 402. An inverting input of the second amplifier 402 is coupled to the working electrode WE and a non-inverting input of the second amplifier 402 is coupled to a fixed bias voltage VBIAS2, for example ground GND. A feedback impedance ZF is coupled between the non-inverting input and an output of the second amplifier 402. As such, the second amplifier 402 operates as a transimpedance amplifier. The second amplifier 402 is thus operable to output a voltage VO which is proportional to the current IWE at the working electrode WE. The output voltage VO is then provided to the analog-to-digital converter (ADC) 306 which outputs a digital output Q which represents the current IWE at the working electrode WE.

To bias the counter electrode CE, and therefore the electrochemical cell 200, at different voltages, the bias voltage VBIAS1 provided to the first amplifier 302 may be adjusted. The bias voltage VBIAS1 may be adjusted between a reference voltage (e.g. ground or zero volts) and the supply voltage VDD. With the non-inverting input of the second amplifier 204 is set at VDD/2, a positive bias may be applied to the cell 200 by maintaining the bias voltage VBIAS above VDD/2. Likewise, a negative bias may be applied to the cell 100 by maintaining the bias voltage VBIAS below VDD/2.

The drive and measurement circuitry 200 described above may be used to implement electro-impedance spectroscopy (EIS) on the cell 100.

To implement conventional EIS, it is conventional to modulate the bias voltage VBIAS1, for example by applying a sine wave having a modulated frequency and/or amplitude. The measurement circuit 304 and ADC 306 may then be used to measure a response of the cell 200 to that sine wave, in the form of the output voltage VO. The frequency of the sine wave may be adjusted over a range of frequencies in order to obtain a series of frequency dependent impedance measurements of the cell 200. This approach tends to give a high signal-to-noise ratio (SNR) in the measured response. However, if the impedance of the cell 200 is to be measured at multiple frequencies (e.g. so as to obtain the series of frequency dependent impedance measurements) the approach can be time consuming. The time misalignment between sequential measurements at different frequencies can introduce measurement error.

An alternative approach to the above EIS technique is chronoamperometry (CA) in which a step or impulse function stimulus is applied to the cell 200. A transfer function between the stimulus and a response of the cell 200 to that stimulus can then be estimated or inferred. This approach is fast when compared to conventional EIS. However, a wide dynamic range is required to accurately capture the response to such stimuli. Additionally, the measured response can be substantially affected by noise and non-linearity in the system which can corrupt measurements, particularly where the applied stimulus has a large amplitude.

In the above conventional approaches, the stimulus is applied at the counter electrode CE. However, in embodiments of the present disclosure described below, instead of interrogating the counter electrode CE to illicit a characterising response, various stimuli are applied via the working electrode WE, for example by modulating a signal applied at the working electrode WE instead. This technique of stimulating the working electrode has advantages, particularly when characterising cells having multiple working electrodes, such as that shown in FIG. 5.

Figure 5:
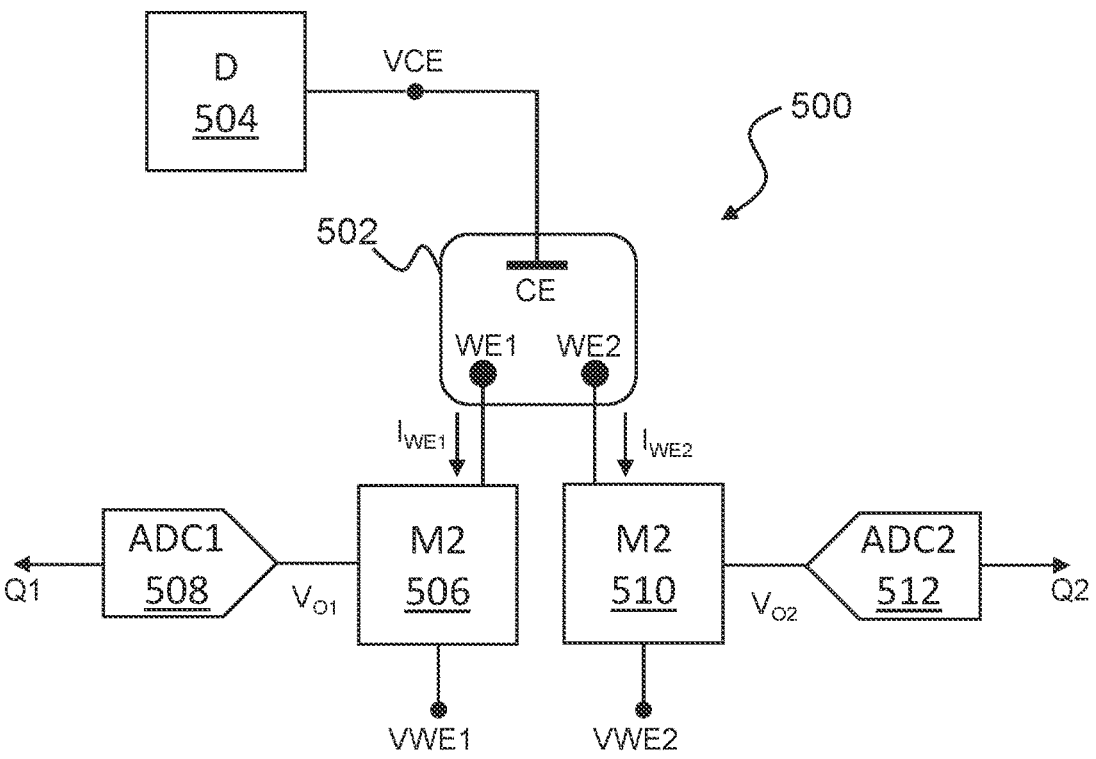
FIG. 5 is a schematic diagram of an example drive and measurement circuit for a multi-working-electrode electrochemical cell.

FIG. 5 illustrates an example drive and measurement circuit 500 for characterising a multi-working-electrode cell 502. The multi-working-electrode cell 502 comprises a first working electrode WE1, a second working electrode WE2, and a counter electrode CE. A counter electrode bias voltage VCE is applied by a drive circuit 504 coupled to the counter electrode CE. The drive circuit 504 may comprise, for example, the first amplifier 302 configured in a similar manner to that shown in FIG. 3. A first measurement circuit 506 is coupled between the first working electrode WE1 and a first ADC 508. A second measurement circuit 510 is coupled between the second working electrode WE1 and a second ADC 512. The first measurement circuit 506 is configured to convert a first current IWE1 at the first working electrode WE1 to a first voltage VO1 provided to the first ADC 510. The second measurement circuit 510 is configured to convert a second current at the second working electrode WE2 to a second voltage VO2 which is provided to the second ADC 512. Each of the first and second measurement circuit may comprise a transimpedance amplifier or a current conveyor. The first and second ADCs 508, 512 are configured to convert respective first and second voltages VO1, VO2 into first and second digital representations Q1, Q2 representing respective first and second currents IWE1, IWE2 at respective first and second working electrode WE1, WE2.

In the arrangement shown in FIG. 5, the presence of two working electrodes WE1, WE2 enables a different stimulus to be applied to each of the working electrodes WE1, WE2. This may be advantageous where each of the working electrodes WE1, WE2 is configured to characterize a different analyte. In which case, it may be beneficial to interrogate the cell 502 via the first working electrode WE1 with a stimulus having different properties (e.g. amplitude and/or frequency properties) to a stimulus used to interrogate the cell 502 via the second working electrode WE2. Additionally or alternatively, where the first and second working electrodes WE1, WE2 are configured to characterise the same analyte, different stimuli may be applied at the first and second working electrode WE1, WE2 to obtain information pertaining to different characteristics associated with the cell 502 (and analytes therein). Thus a more efficient (faster and/or more detailed) characterisation of the cell 502 may be obtained.

The provision of multiple working electrodes with different characteristics may be realised in a variety of different ways. For example, each working electrode WE1, WE2 may be formed on a single substrate (e.g., needle). Multiple different depositions provided on the substrate may form the two separate working electrodes WE1, WE2. The conductor (e.g. metal of the substrate (e.g. needle)) may then form the CE. A common choice for this metal substrate is platinum or silver/silver chloride. In another example, a single substrate (e.g. needle) may be provided with two different layers of depositions at separate points along the substrate, each of the layers forming a working electrode.

Referring again to the single working electrode cell of FIGS. 3 and 4, it will be appreciated that the transfer function (e.g. IWE/VCE) between a stimulus applied to the counter electrode CE and a response measured at the working electrode WE will be different to the transfer function (e.g. IWE/VWE) between a stimulus applied to the working electrode WE and a response measured at the working electrode WE. In particular, when stimulating the working electrode WE, the response measured at the working electrode WE will be made up of the sum of the stimulus and the response of the cell 200. In contrast, when stimulating the counter electrode CE, the measured response at the working electrode WE will be equal to the response of cell 200 only. Accordingly, when stimulating the working electrode WE, the response measured at the working electrode WE is required to be compensated to account for the presence of the applied stimulus in the measured response.

As an example, referring to FIG. 4, the transfer functions TCE, TWE for a response measured at the working electrode WE responsive to stimuli applied at each of the counter electrode CE and the working electrode WE may be defined as follows:

$$\frac{V_0}{V_{CE}} = T_{CE} = -\frac{Z_F}{Z_S}$$

$$\frac{V_0}{V_{WE}} = T_{WE} = 1 + \frac{Z_{TIA}}{Z_S}$$

Where ZF is the feedback impedance ZF and ZS is the nominal impedance of the cell 200.

Hence, an estimate of the cell impedance ZS responsive to a stimulus at each of the counter and working electrodes CE, WE may be defined as follows:

$$Z_{S,CE}^* = -\frac{Z_F}{T_{CE}}$$

$$Z_{S,WE}^* = \frac{Z_F}{T_{WE} - 1}$$

It will be appreciated that when TWE approaches "1", the denominator of Z$, WE approaches zero. Hence, the condition for $Z_{S,WE}^*$ to be valid may be summarised as follows:

$$|Z_F| \gg |Z_S|$$

9
10

It will be appreciated, however, that limiting the feedback impedance ZF to the above condition (e.g. by increasing a capacitance CF of the feedback impedance ZF of the TIA) severely limits the frequency range available for EIS. To avoid the requirement to limit to such a condition, the output voltage VO may be observed, which is given by the following equation derived from the transfer function TWE above:

$$V_0 = V_{WE} + V_{WE} \frac{Z_{TIA}}{Z_S}$$

Thus, by subtracting the stimulus VWE (applied to the working electrode WE) from the output voltage VO measured at the working electrode WE, a more robust estimate of the impedance of the cell 200 can be ascertained, as shown in the equations below:

$$V_0 = V_{WE} \frac{Z_{RF}}{Z_S}$$

$$Z^*_{S,WE} = V_{WE} \frac{Z_{RF}}{V_0}$$

It will be appreciated that subtraction of the stimulus VWE from the output voltage VO may be performed in a variety of locations in the signal chain. For example, subtraction may be performed prior to digitization or digitally after conversion of the output voltage VO into the digital domain.

Various example architectures for implementing the above described stimulation and processing of measured responses of electrochemical cells will now be described.

Figure 6:
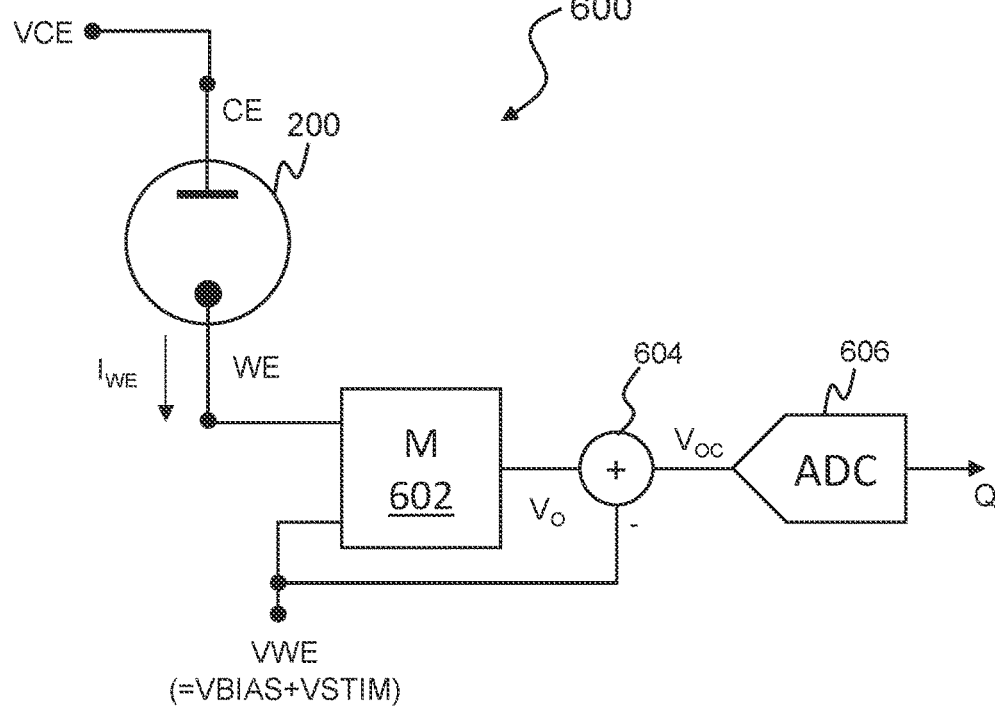
FIG. 6 is a schematic diagram of an example drive and measurement circuit.

FIG. 6 illustrates an example drive and measurement circuit 600 configured for applying a stimulus to the cell 200 via the working electrode WE and obtaining an estimate of a characteristic of the cell 200 (e.g. impedance ZS) also via the working electrode WE. The circuit 600 is configured to subtract a working electrode voltage VWE in the analog domain prior to digitization.

The circuit 600 comprises a measurement circuit 602, a subtractor 604 and an ADC 606. A fixed counter electrode voltage VCE is applied at the counter electrode CE using appropriate circuitry, such as the first amplifier 302 of FIG. 3 (not shown).

The measurement circuit 602 is coupled to the working electrode WE of the cell 200 and configured to output a voltage VO which is proportional to a current IWE at the working electrode WE. The measurement circuit 602 is also configured to apply a stimulus in the form of a working electrode voltage VWE at the working electrode WE. The working electrode voltage VWE may comprise a DC offset VBIAS combined with a stimulation voltage VSTIM. As will be explained in more detail below, the working electrode voltage VWE may be controlled so as to stimulate the cell 200 according to one or more EIS or CA regimes, for example by adjusting the stimulation voltage VSTIM. In some embodiments, the stimulation voltage VSTIM, DC offset VBIAS and/or the working electrode voltage VWE itself may be generated by a digital-to-analog converter (DAC) (not shown) based on a digital input signal.

As noted above, the output voltage VO output from the measurement circuit 602 comprises a component pertaining to the stimulus (the working electrode voltage VWE) applied via the working electrode WE and a component pertaining to the response of the cell 200 to that stimulus.

Accordingly, the output voltage VO is provided to the subtractor 604 which is configured to subtract the working electrode voltage VWE from the output voltage VO to obtain a compensated output voltage VOC which is proportional to the component of the working electrode current IWE related to the response of the cell 200 to the stimulus.

The compensated output voltage VOC is then provided to the ADC 606 which is configured to convert the analog compensated output voltage to a digital representation Q.

As noted above, in a variation of the circuit 600 shown above, instead of the working electrode voltage VWE being subtracted from the measured output voltage VO prior to digitisation, the stimulus VWE may be removed digitally, i.e. from the digital representation Q using digital signal processing. In which case, the subtractor 604 may be omitted, the output voltage VO provided directly to the ADC 606.

Figure 7:
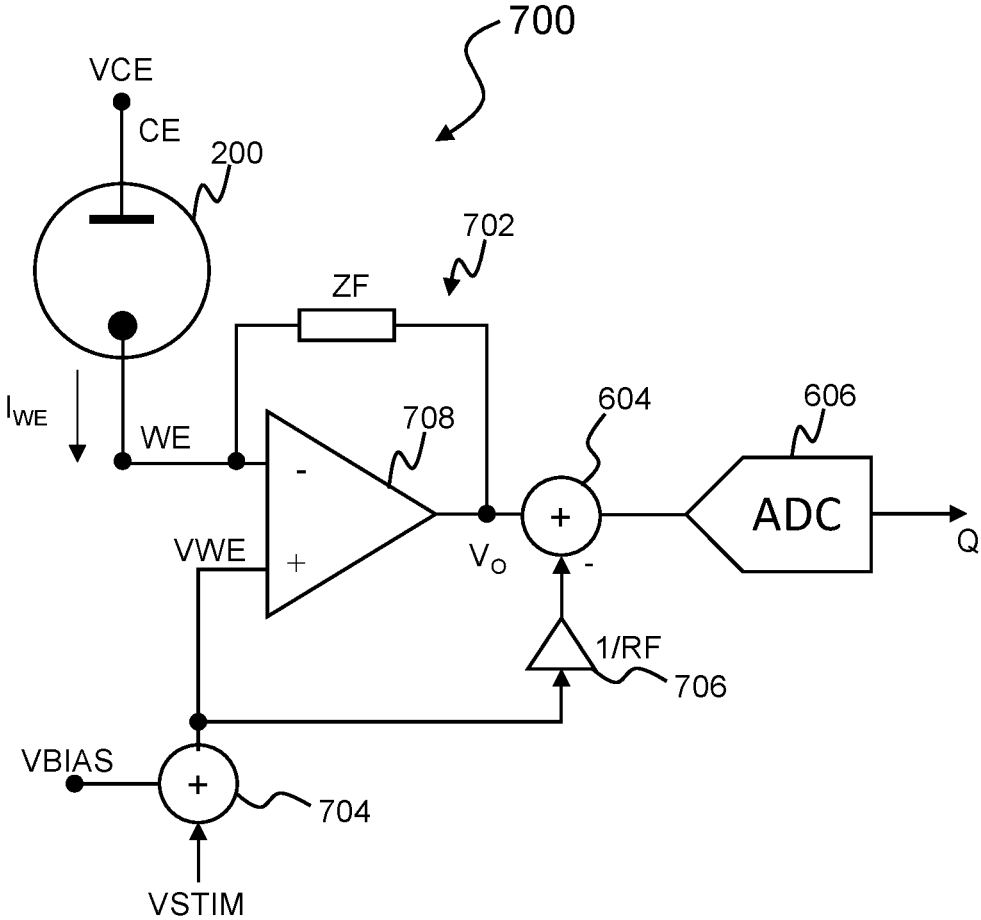
FIG. 7 is a schematic diagram of an example drive and measurement circuit.

FIG. 7 illustrates the circuit 600 of FIG. 6, showing an example implementation of the measurement circuit 602 in more detail. The measurement circuit 603 may comprise a TIA 702, an adder 704 and a gain element 706. Like other TIAs described herein, The TIA 702 comprises a differential amplifier 708 and a feedback impedance ZF. The differential amplifier 708 has an inverting input coupled to the working electrode WE of the cell 200, a non-inverting input coupled to an output of the adder 704, and an output coupled to the subtractor 604. The feedback impedance ZF is coupled between the inverting input and output of the differential amplifier 708. To form the working electrode voltage, a DC bias voltage VBIAS may be combined with a stimulation voltage VSTIM at the adder 704. The working electrode voltage VWE is then provided to the non-inverting input of the amplifier 708. The output of the adder 704 is coupled to an input of the gain element 706 which may be configured to apply a gain equal to 1/ZF. An output of the gain element 706 is then provided to the subtractor 604 which subtracts the working electrode voltage VWE from the output voltage VO output from the TIA 702. During operation, the TIA 702 works to maintain the voltage at the working electrode at the working electrode voltage VWE provided to the non-inverting input of the differential amplifier 708. As such, the stimulus voltage VSTIM, which is combined into the working electrode voltage VWE is applied to the working electrode WE.

In a variation of the above, the measurement circuit 603 may comprise a current conveyor in place of the TIA 702. In which case, the current conveyor may be arranged such that an X (low input impedance) terminal of the current conveyor is coupled to the working electrode WE, a Y (high input impedance) terminal of the current conveyor is coupled to the output of the adder 704, and a Z (high output impedance) terminal of the current conveyor is coupled to an input of the subtractor 604. Current conveyors are well known in the art so will not be described in detail below.

Similarly, in any of the embodiments described below comprising a TIA, the TIA may be replaced with a current conveyor in a similar manner. In a further variation of any one of the embodiments described herein in which a TIA is utilized, the TIA may be replaced with a switching potentiostat.

Figure 8:
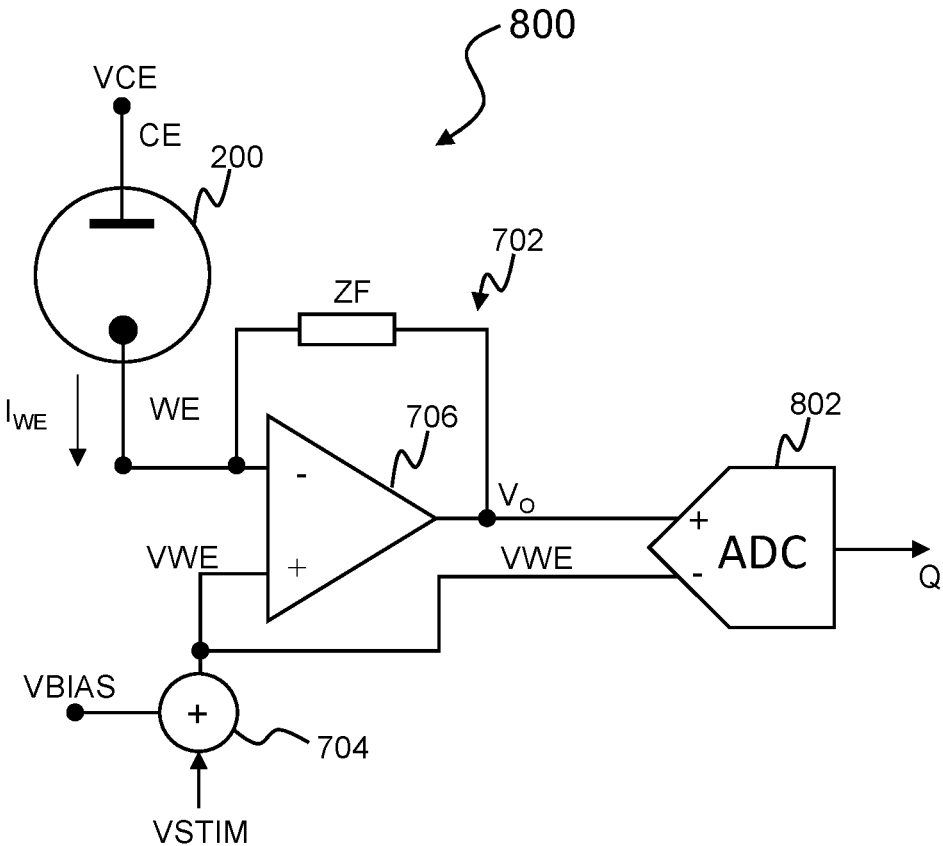
FIG. 8 illustrates a variation of the example drive and measurement circuit shown in FIG. 7.

FIG. 8 illustrates an example drive and measurement circuit 800 which is a variation of the circuit 700 of FIG. 8, like parts having been denoted by like numerals. The circuit 800 of FIG. 8 differs from the circuit 700 of FIG. 7 in that the gain element 706, the subtractor 604 and the ADC 606 have been replaced with a differential ADC 802. The differential ADC 802 comprises an inverting input, a non-inverting input and an output. The working electrode voltage VWE obtained from the adder 704 is provided to the inverting input of the differential ADC 802. The output voltage VO output from the TIA 702 is provided to the non-inverting input of the differential ADC 802. The differential ADC 802 converts the difference in voltage between the analog non-inverting and inverting inputs of the ADC 802 to a digital representation Q. This has the effect of subtracting the working electrode voltage VWE from the output voltage VO in the analog-to-digital conversion.

Figure 9:
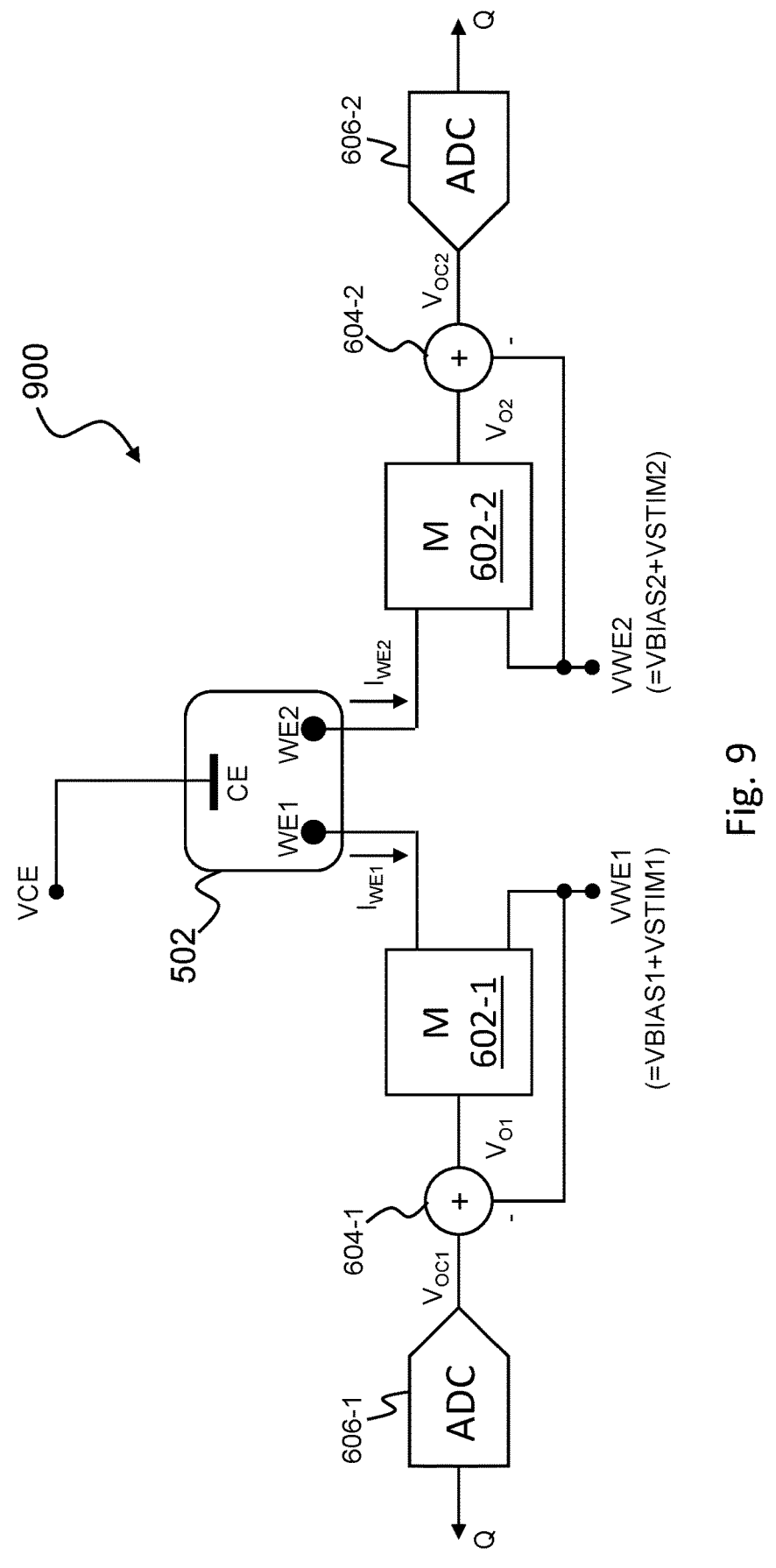
FIG. 9 illustrates a variation of the example drive and measurement circuit shown in FIG. 6 adapted for characterisation of a multi-working-electrode cell.

FIG. 9 illustrates an example drive and measurement circuit 900 for characterising the multi-electrode-cell 502 shown in FIG. 5. The circuit 900 is a variation of the circuit 600 shown in FIG. 6, the measurement circuit 602, subtractor 604 and ADC 606 having been duplicated such that each of the first and second working electrode WE1, WE2 can be stimulated independently and independent measurements of working electrode current IWE1, IWE2 obtained at each of the working electrodes WE1, WE2. The circuit 900 comprises a first measurement circuit 602-1 coupled to the first working electrode WE1 of the cell 502, a first subtractor 604-1 and a first ADC 606-1 arranged in a similar manner to the measurement circuit 602, subtractor 604 and ADC 606 of FIG. 6. The circuit 900 further comprises a second measurement circuit 602-2 coupled to the second working electrode WE2 of the cell 502, a second subtractor 604-2 and a second ADC 606-2 arranged in a similar manner to the measurement circuit 602, subtractor 604 and ADC 606 of FIG. 6. Each of the first and second measurement circuits 602-1, 602-2 may be implemented by a TIA (such as the TIA 702 shown in FIG. 7), a current conveyor or another conceivable circuit.

During operation, the circuit 900 is configurable to stimulate each of the working electrodes WE1, WE2 individually and measure respective responses between the counter electrode CE and respective first and second working electrodes WE1, WE2.

In FIG. 9 the architecture shown in FIG. 6 (comprising the measurement circuit 602, subtractor 604 and ADC 606) has been duplicated for each working electrode WE1, WE2. In a further variation, the architecture shown in either of FIG. 7 or 8 may be duplicated to drive and measure signals at respective first and second working electrodes WE1, WE2. It will also be appreciated that such architecture may be extended to characterise cells having more than two working electrodes, such as those having N (e.g. three or four) working electrodes.

In the circuit 900 and all of the above described variations, multiple ADCs are provided, one for each of the working electrodes. In yet further variations, the multiple ADCs may be replaced with a signal ADC which may be multiplexed across multiple channels using one or more multiplexers. Each of the output voltage VO1, VO2 ( . . . VON) may be sampled in turn to obtain digital representations Q1, Q2 ( . . . QN) representing working electrode currents IWE1, IWE2, ( . . . IWEN) associated with each of the working electrodes WE1, WE2 ( . . . WEN).

As noted above, the various digital representations Q, Q1, Q2 etc., represent a working electrode current flowing from the various working electrodes. Depending on the stimulus applied to the working electrode, different characteristics of the various cells can be ascertained. As noted above, embodiments of the present disclosure may stimulate a working electrode using EIS techniques, for example with one or more sine waves (which may be modulated in frequency and/or amplitude). Additionally or alternatively, embodiments of the present disclosure may stimulate a working electrode using CA techniques, for example by applying a step or impulse signal at the working electrode.

Thus, the digital representation may be analysed to determine one or more characteristics of a cell. Such characteristics may include one or more of a) an optimum bias voltage to be applied to the electrochemical cell during sensing of an analyte; b) a quality of an electrolyte in the electrochemical cell; c) a fault at the electrochemical cell; d) one or more offsets for processing signals obtained from the electrochemical cell; and e) updates for an equivalent circuit model (ECM) for the electrochemical cell. Other characteristics not listed above may also be obtained.

As noted above, FIGS. 6 to 9 are described with reference to various electrochemical cells 100, 200, 502 to which a voltage VWE is applied and a current IWE is measured. An example of such a cells 100, 200, 502 is a potentiostat, which may be used for sensing applications (such as analyte sensing). Notwithstanding, the various circuitry and electrochemical cells described herein may equally be incorporated into an electrical battery or system for characterising or monitoring a state of a battery, such as a battery monitor or a battery management system (BMS). The term "battery monitor" and "battery management system" are well known in the art and are not to be limited to a special or customized meaning.

The various circuitry and electrochemical cells described herein may be incorporated into a continuous analyte sensor or a continuous glucose sensor or a continuous glucose monitor. The terms "continuous analyte sensor", "continuous glucose sensor", and "continuous glucose monitor" as used herein, will be well-known to a person of ordinary skill in the art and are not to be limited to a special or customized meaning. These terms refer, without limitation, to a device that continuously measures a concentration of an analyte/glucose and/or calibrates the sensor or an electrochemical cell incorporated therein (e.g., by continuously adjusting or determining the sensor's sensitivity and background).

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

The invention claimed is:

1. Circuitry for determining one or more characteristics of an electrochemical cell comprising a first working electrode and a counter electrode, the circuitry comprising:

drive circuitry configured to apply a first stimulus to the first working electrode;

measurement circuitry configured to measure a first response to the first stimulus at the first working electrode; and processing circuitry configured to:

apply compensation to the first response to obtain a first corrected response of the electrochemical cell to the first stimulus; and determine a first characteristic of the one or more characteristics of the electrochemical cell based on the first corrected response, the first characteristic associated with the first working electrode;

wherein applying compensation to the first response comprises subtracting the first stimulus from the first response.

2. Circuitry of claim 1, wherein the first stimulus comprises a sine wave.

3. Circuitry of claim 2, wherein the sine wave is modulated by one or more of amplitude and frequency.

4. Circuitry of claim 1, wherein the first stimulus comprises a step signal or an impulse signal.

5. Circuitry of claim 1, wherein applying the first stimulus comprises:

modulating a first working bias voltage applied at the first working electrode.

6. Circuitry of claim 1, wherein the drive circuitry is configured to:

apply a counter bias voltage at the counter electrode.

7. Circuitry of claim 1, wherein the processing circuitry comprises:

a differential analog-to-digital converter (ADC), comprising:

a first analog input configured to receive the first response;

a second analog input configured to receive the first stimulus; and a digital output configured to output the first corrected response.

8. Circuitry of claim 1, wherein the processing circuitry comprises:

an analog-to-digital converter (ADC), comprising:

a first analog input configured to receive the first response; and a digital output configured to output a first digital response signal; and compensation circuitry configured to subtract a digital representation of the first stimulus from the first digital response signal to obtain the first corrected response signal.

9. Circuitry of claim 1, wherein the first stimulus is a voltage stimulus and the first response is a response current.

10. Circuitry of claim 1, wherein the first characteristic is an impedance or a resistance of the electrochemical cell.

11. Circuitry of claim 1, wherein the drive circuitry comprises:

a digital-to-analog converter configured to generate the first stimulus based on a digital input signal.

12. Circuitry of claim 1, comprising:

a first transimpedance amplifier, comprising:

a first inverting input coupled to the first working electrode;

a first non-inverting input configured to receive the first stimulus; and a first output configured to output the first response.

13. Circuitry of claim 1, comprising:

a current conveyor, comprising:

a first input coupled to the first working electrode;

a second input coupled configured to receive the first stimulus; and a first output configured to output the first response.

14. Circuitry of claim 1, wherein the electrochemical cell comprises a second working electrode, wherein:

the drive circuitry is configured to apply a second stimulus to the second working electrode;

the measurement circuitry is configured to measure a second response at the second working electrode; and the processing circuitry is configured to:

apply compensation to the second response to obtain a second corrected response of the electrochemical cell to the second stimulus; and determine a second characteristic of the one or more characteristic of the electrochemical cell based on the second corrected response, the second characteristic associated with the second working electrode.

15. Circuitry of claim 14, wherein applying compensation to the second response comprises:

subtracting the second stimulus from the second response.

16. Circuitry of claim 14, wherein the first working electrode is configured to detect a first analyte and the second working electrode is configured to detect second analyte different from the first analyte.

17. Circuitry of claim 16, wherein the first and second analytes comprise one of glucose, lactate and ketone.

18. Circuitry claim 1, wherein the processing circuitry is configured to determine, based on the determined first characteristic, one or more of the following:

a) a bias voltage to be applied to the electrochemical cell during sensing of an analyte;

b) a quality of an electrolyte in the electrochemical cell;

c) a fault at the electrochemical cell;

d) one or more offsets for processing signals obtained from the electrochemical cell;

e) updates for an equivalent circuit model (ECM) for the electrochemical cell.

19. Circuitry of claim 1, wherein the electrochemical cell is an electrochemical sensor, wherein the first stimulus is a stimulus voltage, and wherein the first response is a response current.

20. Circuitry of claim 1, wherein the drive circuitry comprises a digital-to-analog converter configured to generate the first stimulus responsive to a first digital input signal.

21. Circuitry of claim 1, wherein the electrochemical cell comprises a potentiostat or a battery.

22. A system comprising:

the circuitry of claim 1; and the electrochemical cell.

23. An electronic device comprising the circuitry of claim 1, wherein the electronic device comprises one of an analyte monitoring device, an analyte sensing device, a continuous glucose monitor, a battery, a battery monitor, a mobile computing device, a laptop computer, a tablet computer, a games console, a remote control device, a home automation controller, a domestic appliance, a toy, a robot, an audio player, a video player, a mobile telephone, and a smartphone.

24. A method of determining one or more characteristics of an electrochemical cell comprising a first working electrode and a counter electrode, the method comprising:

applying, with drive circuitry, a first stimulus to the first working electrode;

measuring, with measurement circuitry, a first response at the first working electrode;

applying, with processing circuitry, compensation to the first response to obtain a first corrected response of the electrochemical cell to the first stimulus;

determining, with the processing circuitry, a first characteristic of the one or more characteristics of the electrochemical cell based on the first corrected response, the first characteristic associated with the first working electrode;

wherein applying compensation to the first response comprises subtracting the first stimulus from the first response.

25. Circuitry for determining one or more characteristics of an electrochemical cell comprising a first working electrode and a counter electrode, the circuitry comprising:

drive circuitry configured to apply a first stimulus to the first working electrode;

measurement circuitry configured to measure a first response to the first stimulus at the first working electrode;

processing circuitry configured to:

apply compensation to the first response to obtain a first corrected response of the electrochemical cell to the first stimulus; and determine a first characteristic of the one or more characteristics of the electrochemical cell based on the first corrected response, the first characteristic associated with the first working electrode, wherein the measurement circuitry comprises a first transimpedance amplifier, comprising:

a first inverting input coupled to the first working electrode;

a first non-inverting input configured to receive the first stimulus; and a first output configured to output the first response.

26. Circuitry for determining one or more characteristics of an electrochemical cell comprising a first working electrode and a counter electrode, the circuitry comprising:

drive circuitry configured to apply a first stimulus to the first working electrode;

measurement circuitry configured to measure a first response to the first stimulus at the first working electrode; and processing circuitry configured to:

apply compensation to the first response to obtain a first corrected response of the electrochemical cell to the first stimulus; and determine a first characteristic of the one or more characteristics of the electrochemical cell based on the first corrected response, the first characteristic associated with the first working electrode, wherein the measurement circuitry comprises a current conveyer, comprising:

a first input coupled to the first working electrode;

a second input coupled configured to receive the first stimulus; and a first output configured to output the first response.

27. Circuitry for determining one or more characteristics of an electrochemical cell comprising a first working electrode and a counter electrode, the circuitry comprising:

drive circuitry configured to apply a first stimulus to the first working electrode;

measurement circuitry configured to measure a first response to the first stimulus at the first working electrode; and processing circuitry configured to:

apply compensation to the first response to obtain a first corrected response of the electrochemical cell to the first stimulus; and determine a first characteristic of the one or more characteristics of the electrochemical cell based on the first corrected response, the first characteristic associated with the first working electrode, wherein the electrochemical cell comprises a second working electrode, wherein:

the drive circuitry is configured to apply a second stimulus to the second working electrode;

the measurement circuitry is configured to measure a second response at the second working electrode; and the processing circuitry is configured to:

apply compensation to the second response to obtain a second corrected response of the electrochemical cell to the second stimulus; and determine a second characteristic of the one or more characteristic of the electrochemical cell based on the second corrected response, the second characteristic associated with the second working electrode.

* * * * *